US006358569B1

(12) United States Patent
Badyal et al.

(10) Patent No.: US 6,358,569 B1
(45) Date of Patent: Mar. 19, 2002

(54) APPLYING A FILM TO A BODY

(75) Inventors: Jas Pal S Badyal, Wolsingham; Simon J. Hutton, Pudsey, both of (GB)

(73) Assignee: Mupor Limited, Boss-shire (GB)

( * ) Notice: Subject to any disclaimer, the term of this patent is extended or adjusted under 35 U.S.C. 154(b) by 0 days.

(21) Appl. No.: 09/582,051

(22) PCT Filed: Dec. 18, 1998

(86) PCT No.: PCT/GB98/03838

§ 371 Date: Jan. 25, 2001

§ 102(e) Date: Jan. 25, 2001

(87) PCT Pub. No.: WO99/32235

PCT Pub. Date: Jul. 1, 1999

(30) Foreign Application Priority Data

Dec. 18, 1997 (GB) ............................................ 9726807

(51) Int. Cl.[7] .................................................. C08J 7/18

(52) U.S. Cl. ............... 427/490; 427/255.23; 427/255.3; 427/488; 427/492; 427/493; 427/570

(58) Field of Search ................................ 427/488, 490, 427/492, 493, 570, 255.23, 255.3

(56) References Cited

FOREIGN PATENT DOCUMENTS

| | | |
|---|---|---|
| FR | 2 465 761 | 3/1981 |
| JP | 57147514 | 9/1982 |
| WO | WO 97/42356 | 11/1997 |

*Primary Examiner*—Bernard Pianalto
(74) *Attorney, Agent, or Firm*—Pennie & Edmonds LLP

(57) ABSTRACT

A method of applying a thin film to a body comprising exposing the body to pulsed-gas cold-plasma polymerization of an unsaturated-carboxylic acid monomer thereby forming a polymer film on a surface of the body.

15 Claims, 17 Drawing Sheets

APPLYING A FILM TO A BODY

This invention relates to a method of applying a fluoropolymer film to a body and to bodies so treated.

Oleophobic or superhydrophobic surfaces are desired for a number of applications. The invention arises out of investigations of the phenomenon of surfaces with lower energy than ptfe (polytetrafluoroethylene) by taking advantage of the effect arising from attachment $CF_3$ groups to a variety of materials.

The invention may be applicable to thin films usable in polymeric filter media and to cold plasma treatments to create low energy surfaces upon low-cost thermoplastics and natural media, and to the functionalisation of fluorinated polymers such as PTFE and PVDF (polyvinylidene difluoride). This specification discusses a plasma procedure leading to a thin film of perfluoroalkyl groups upon a substrate, which will exhibit superhydrophobicity or oleophobicity. By this we mean that the surface will repel liquid with surface energies as low as that of acetone and alcohol.

The controlled deposition of many plasma polymers has been examined and the ratio of $CF_2$ to $CF_3$ is documented in terms of monomer type, plasma power levels and proximity to the glow region. We are now describing a new method for creating surfaces with greater coverage of functional groups which offers a novel approach to the creation of polymer surfaces by pulsed gas introduction of the plasma.

According to the present invention, a method of applying a fluoropolymer film to a porous or microporous or other body, comprises exposing the body to cold plasma polymerisation using a pulsed gas regime to form either (i) an adherent layer of unsaturated carboxylic (e.g. acrylic) acid polymer on the surface and then derivatising the polymer to attach a perfluoroalkyl group terminating in —$CF_3$ trifluoromethyl. A combination of electrical and gas pulsing may be used.

Preferably, the cold method of applying a fluoropolymer film according to 1 and 2 wherein the cold plasma polymerisation uses an unsaturated carboxylic acid.

The "gas on" and "gas off" times are preferably from 0.1 microsecond to 10 seconds.

The pulsed gas may be oxygen, or may be a noble or inert gas or $H_2$, $N_2$ or $CO_2$. Alternatively, acrylic acid polymer precursor may be pulsed directly without a process gas.

The body may be a film (not necessarily microporous) or of other geometry that allows coating by plasma polymerisation to a standard of consistency adequate for the end use.

The method may be stopped at any stage, when the applied film is continuous and impervious or at an earlier stage, when it is to a greater or lesser extent still apertured, i.e. has not yet completely filled in the underlying pores of the body. The pore size of the finished product can be set to any desired value by ceasing the method after an appropriate duration.

The plasma power is preferably 1W to 100W, more preferably 1.5W to 7W.

The invention extends to the body with the thus-applied film. The substrate material of the body may be carbonaceous (e.g. a natural material such as cellulose, collagen or alginate, e.g. linen), synthetic, ceramic or metallic or a combination of these.

Electrical pulsing of the radio frequency supply to the plasma is known. This technique can endure a more rapid deposition and greater coverage of the substrate surface by the plasma polymer. We have utilised the plasma polymerisation of acrylic acid, which again is known but using a pulsed gas regime and clearly there are many other possible unsaturated carboxylic acids available as monomers. It is believed that such functionalities impart a degree of biocompatibility to substrates and allow of call culture experiments to be undertaken successfully upon such a surface even with difficult an sensitive cell lines.

By virtue of a derivatisation stage, the acid group may be reacted with a range of materials, for example perfluoralkylamines, to yield a surface rich in perfluoroalkylamide groups. In this way the surface would predominate in $CF_3$ functions. Additionally the use of fluorinated surfactants will similarly generate a surface film of lower energy than ptfe and find application in for example the packaging market where oleophobic materials are desirable.

In the packaging market, there is a need for oleophobic venting films where the contents of a vessel or a package may require the release of differential pressure. Such pressure differentials may arise from expansion or contraction of the container or the liquid contents, with changes in the ambient temperature or pressure. The liquid contents must be retained without leakage and so porous venting aids are used. In those situations where liquids of low surface tension are involved e.g. surfactants, detergents, or organic solvents, then conventional porous ptfe materials are not as efficient. The surface energy of such materials is of the order of 18 to 20 dynes/cm at 20° C. and the energy of a $CF_3$ surface is less at perhaps 6 dynes/cm, and can be influenced by the plasma conditions used for the deposition. It is also known that the substrate morphology can influence the value of the contact angle since surfaces of a certain roughness can lead to composite angels. The surface which has the greatest number of $CF_3$ groups packed together will have the lowest surface energy.

Products having superior (high density) surface coverage, rapidly deposited, may arise from gas pulsing alone or in combination with R.F. pulsing. Such materials have application in filtration, chromatography, medical device and laboratory ware. For example low cost thermoplastics could be coated using perfluorocarbon monomers to afford ptfe-like properties.

The body or substrate upon which the superhydrophobic layer is attached may be a carbonaceous polymer, e.g. a fluoropolymer such as ptfe, optionally itself a film, which may be porous or microporous. The process can also be applied to other polymers such as polyethylene and a range of other materials used for the biocompatible properties conferred by the acidic groups. Additionally by conversion to functionalities terminating in perfluoroalkyl groups the superhydrophobic properties of the closely spaced $CF_3$ groups can be utilsed. In certain applications it is commercially attractive to change the surface properties of low cost materials such that they become superhydrophobic. For example cellulose of polyurethane foam are used for their absorbent nature in wound dressings and incontinence and other sanitary products. By virtue of the hydrophobic layer being present in the wicking effect can be directed and the flow of exudate or moisture constrained. Similarly for fluids with lower surface tension a superhydrophobic or oleophobic layer would offer the same mechanism.

A specific embodiment of the invention will now be described by way of example with reference to the accompanying drawings (all graphs), in which:

XPS spectra; and (b) O/C ratio and percentage retention of acid functionality.

Figure 3A:
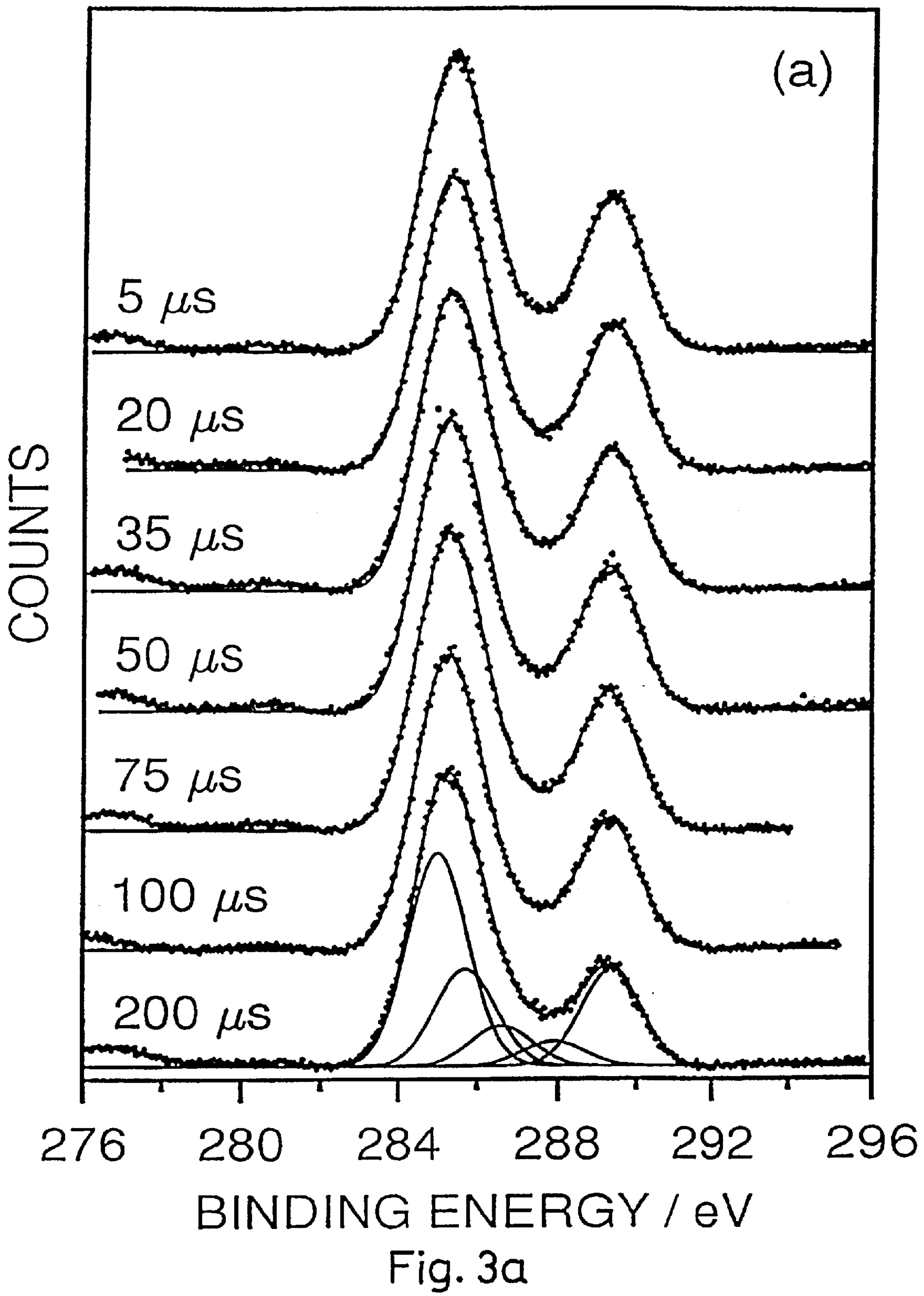
Figure 3B:
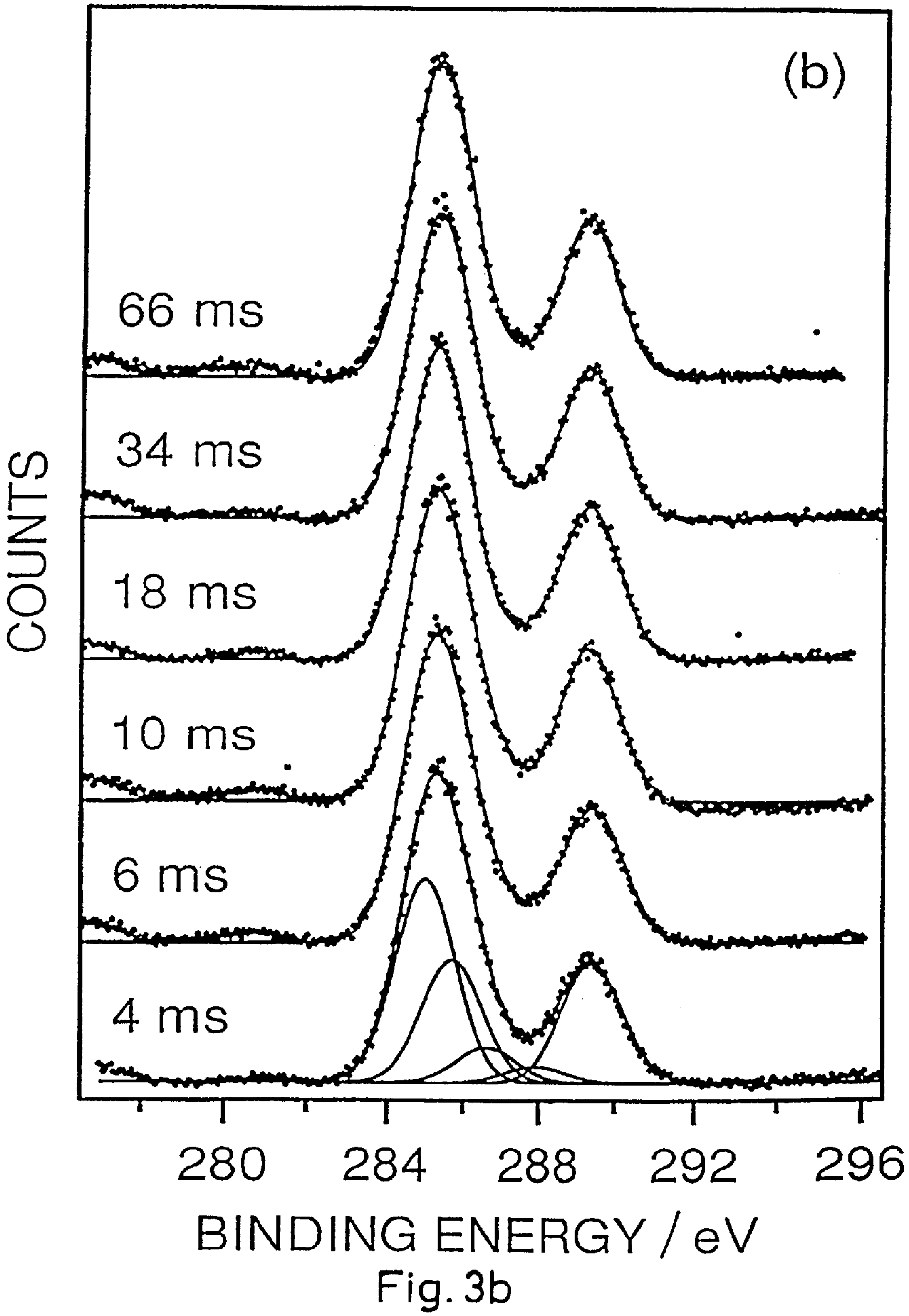

FIGS. 3*a* and 3*b* show C(Is) XPS spectra for electrically pulsed plasma polymerisation of acrylic acid: (a) as a function of $T_{on}$ ($T_{off}$=4 ms and $P_p$=5 W); and (b) as a function of $T_{off}$ ($T_{on}$=175 μs and $P_p$=5 W).

Figure 4A:
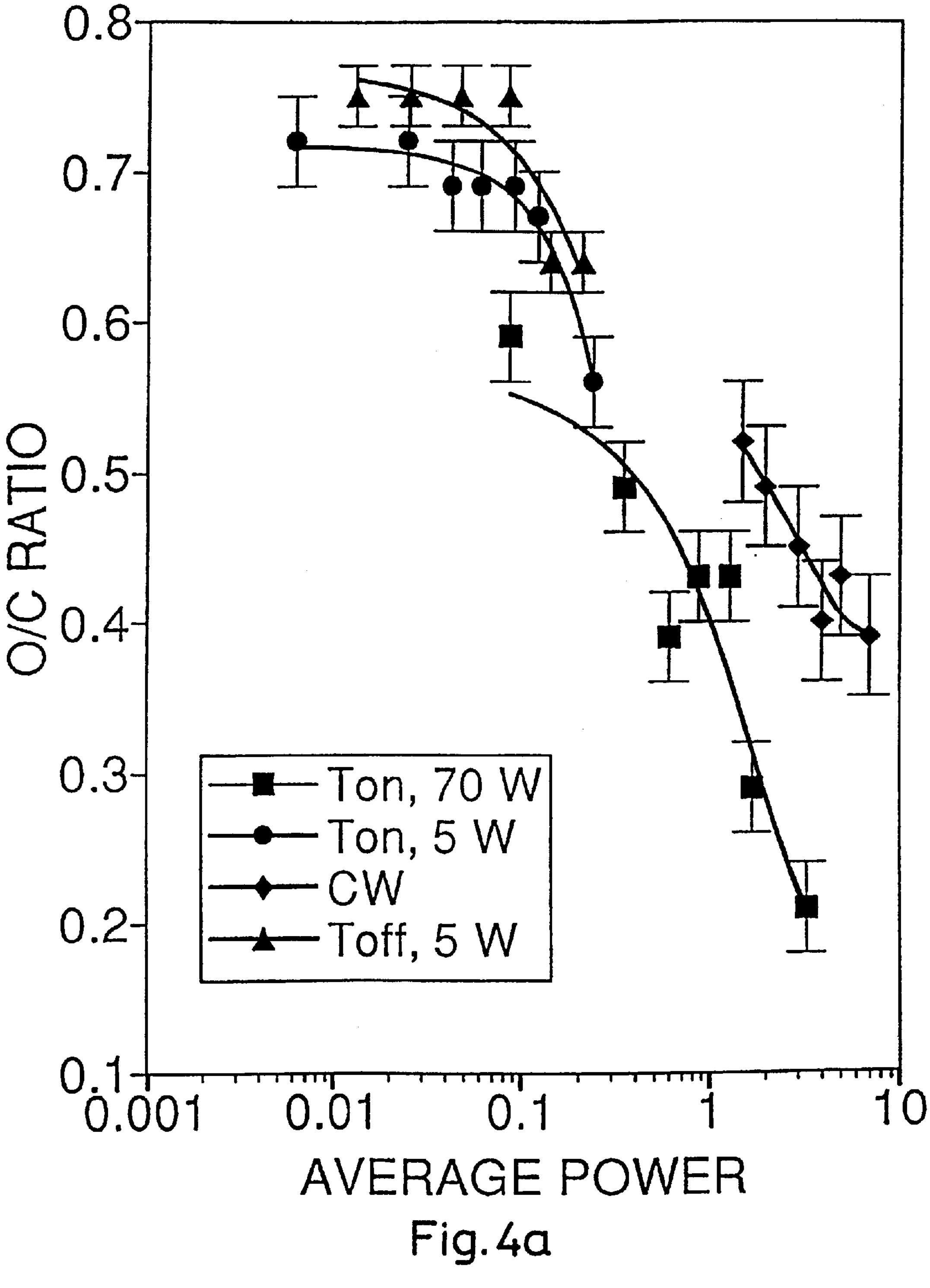
Figure 4B:
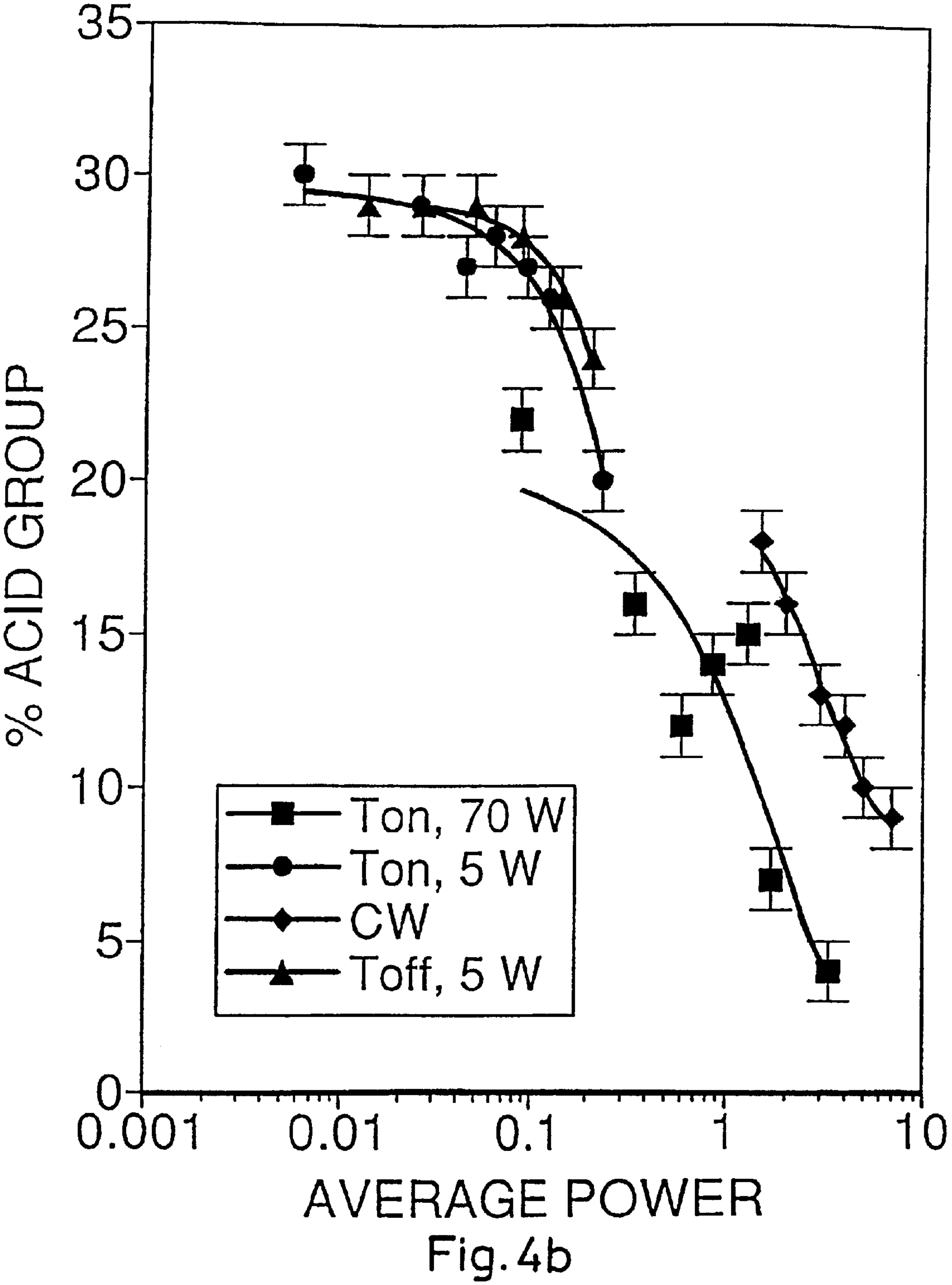

FIGS. 4*a* and 4*b* show dependence on average power of: (a) oxygen:carbon ratios; and (b) percentage acid group incorporation for continuous wave; and electrically pulsed plasma polymerisation of acrylic acid as a function of $T_{on}$ ($T_{off}$=4 ms and $P_p$=5 W and 70 W) and $T_{off}$ ($T_{on}$=175 μs and $P_p$=5 W).

Figure 5:
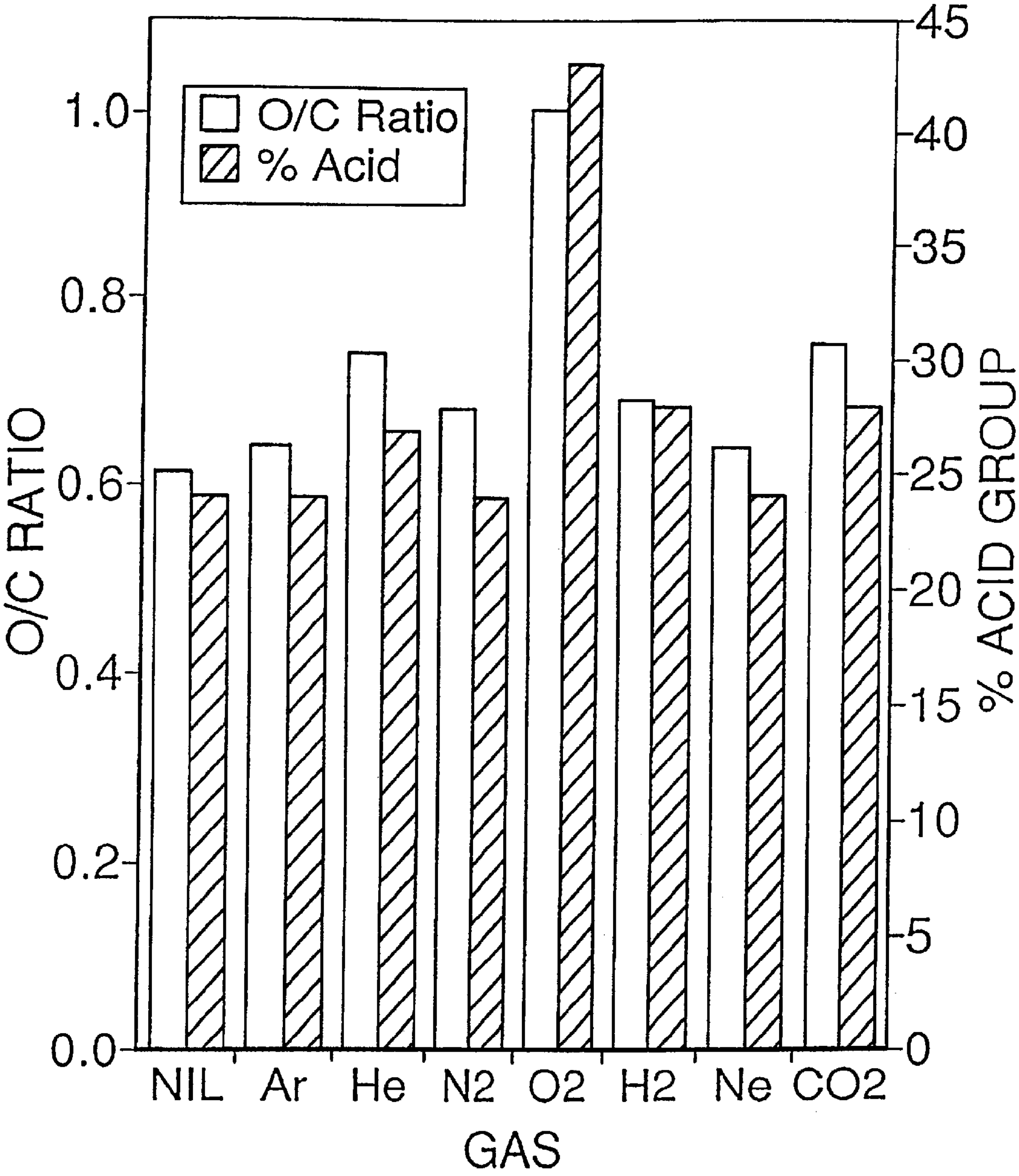

FIG. 5 shows variation in the O/C ratio and percentage acid group incorporation during electrical and gas pulsed plasma polymerisation of acrylic acid using different gases ($T_{on}$=175 μs $T_{off}$=4 ms and $P_p$=5 W).

Figure 6A:
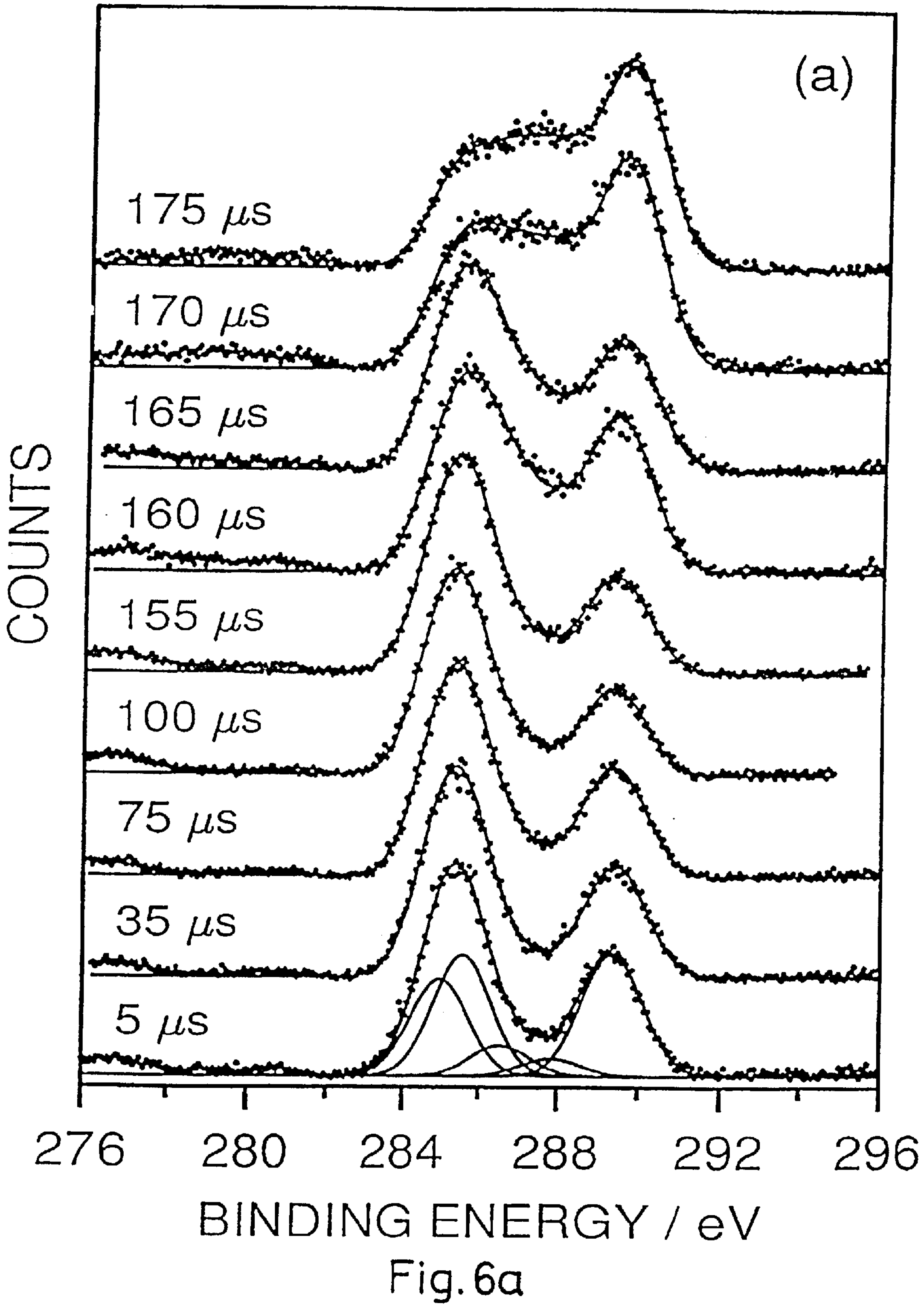
Figure 6B:
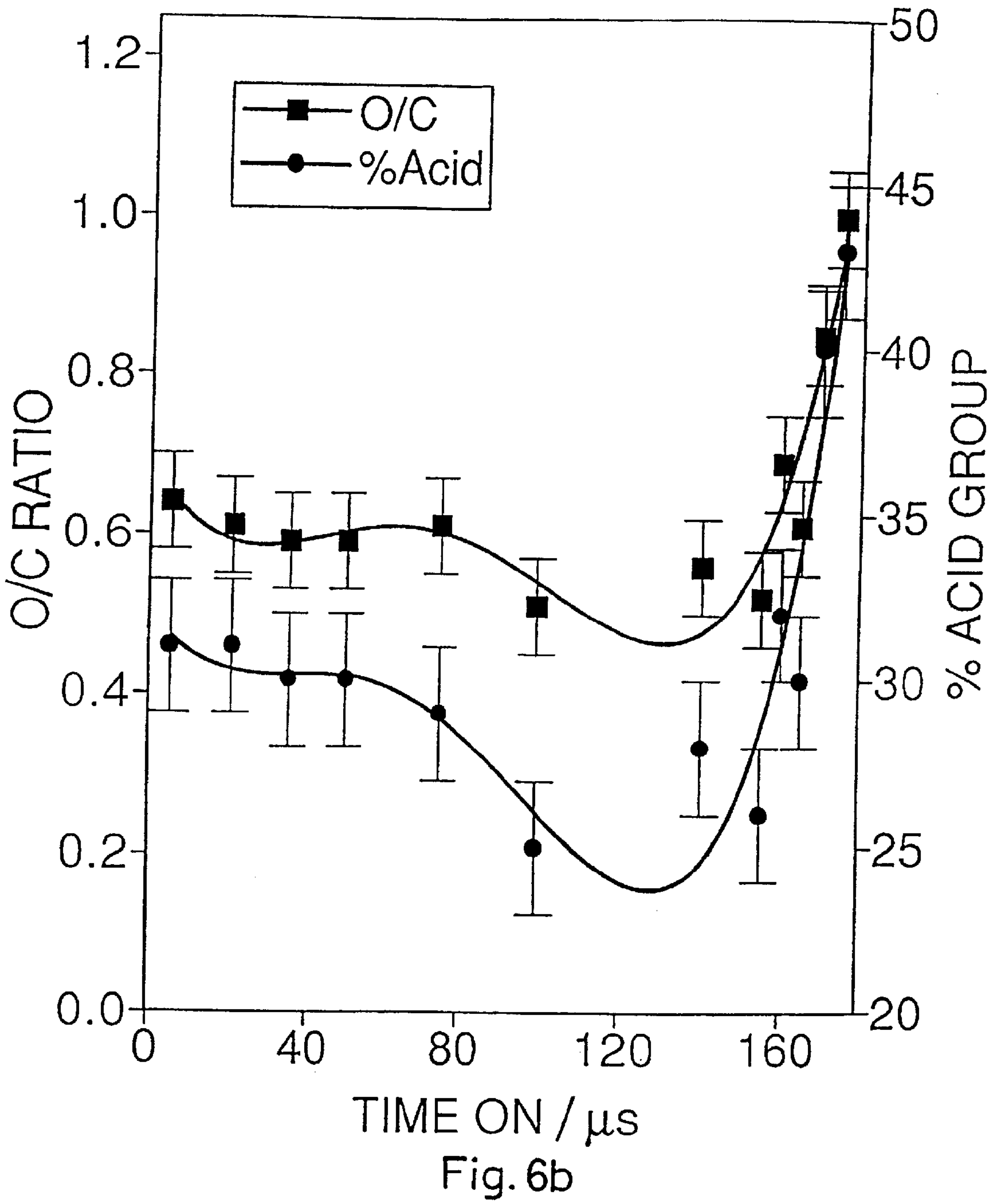

FIGS. 6*a* and 6*b* show electrical and gas pulsed plasma polymerisation of acrylic acid using oxygen as a function of $T_{on}$ ($T_{off}$=4 ms and $P_p$=5 W):(a) C(Is) XPS spectra; and (b) O/C ratio and percentage of acid group retention.

Figure 7A:
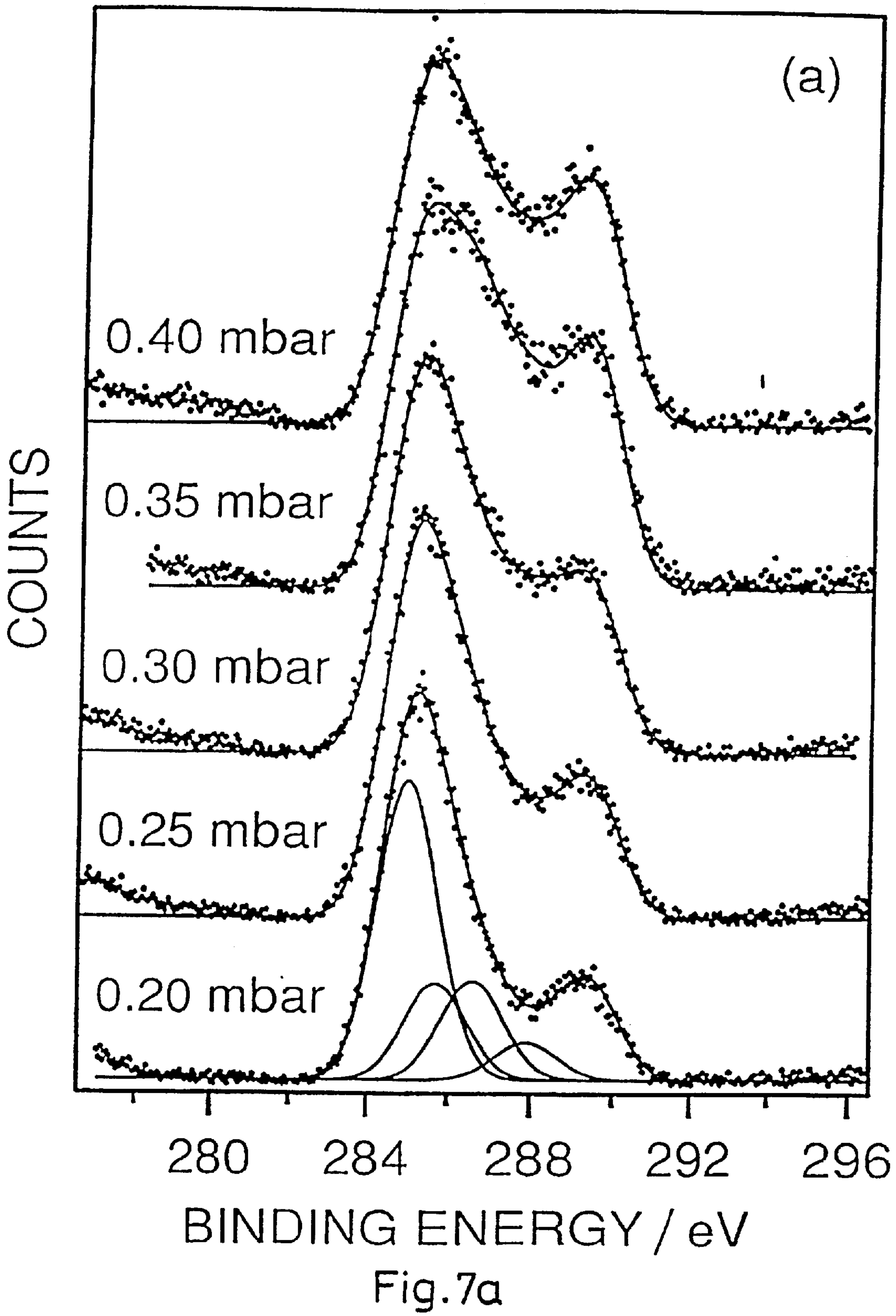
Figure 7B:
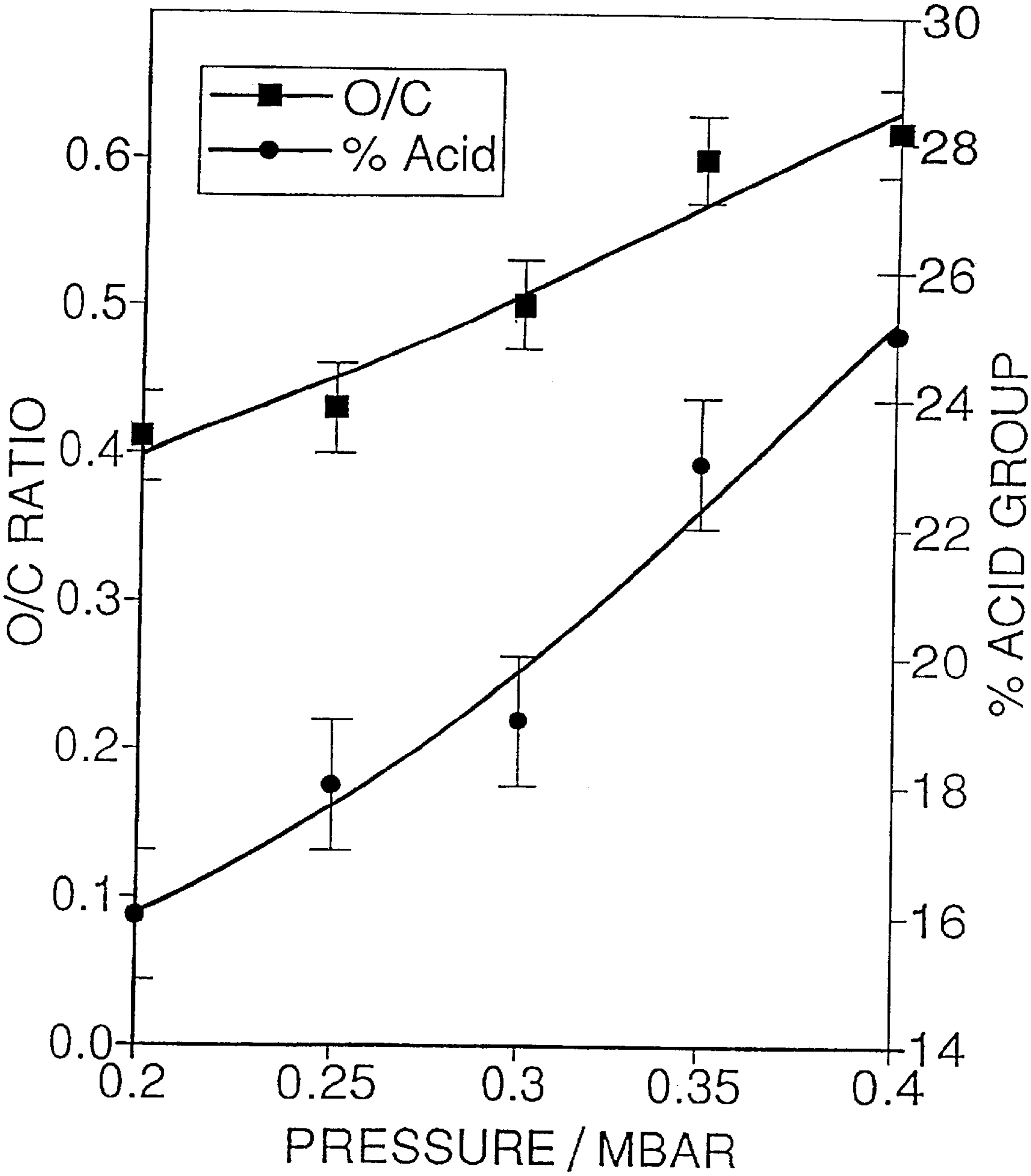

FIGS. 7*a* and 7*b* show 2 W continuous wave plasma polymerisation of acrylic acid as a function of oxygen pressure: (a) C(Is) XPS spectra; and (b) O/C ratio and percentage retention of acid functionality.

Figure 8A:
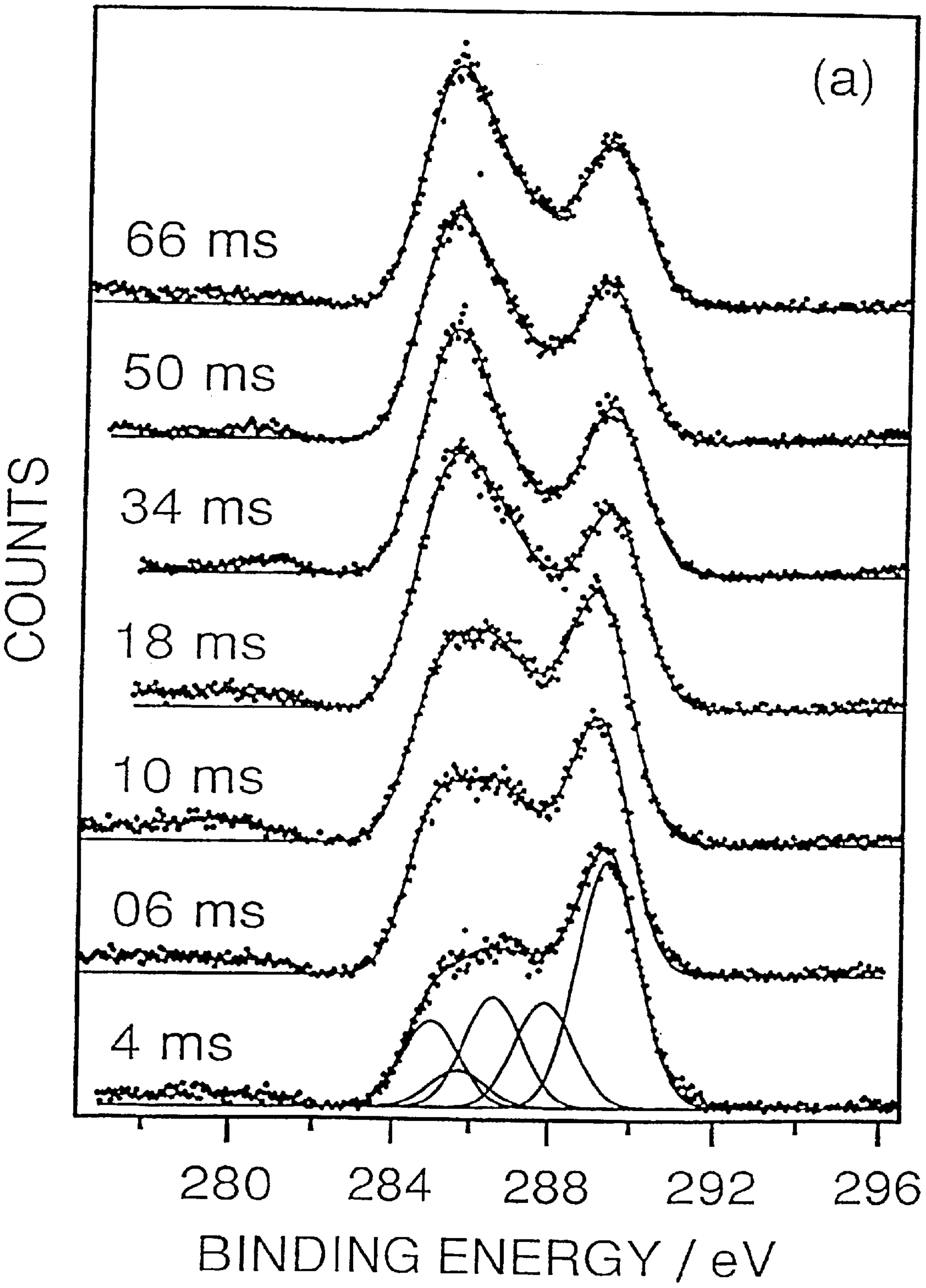
Figure 8B:
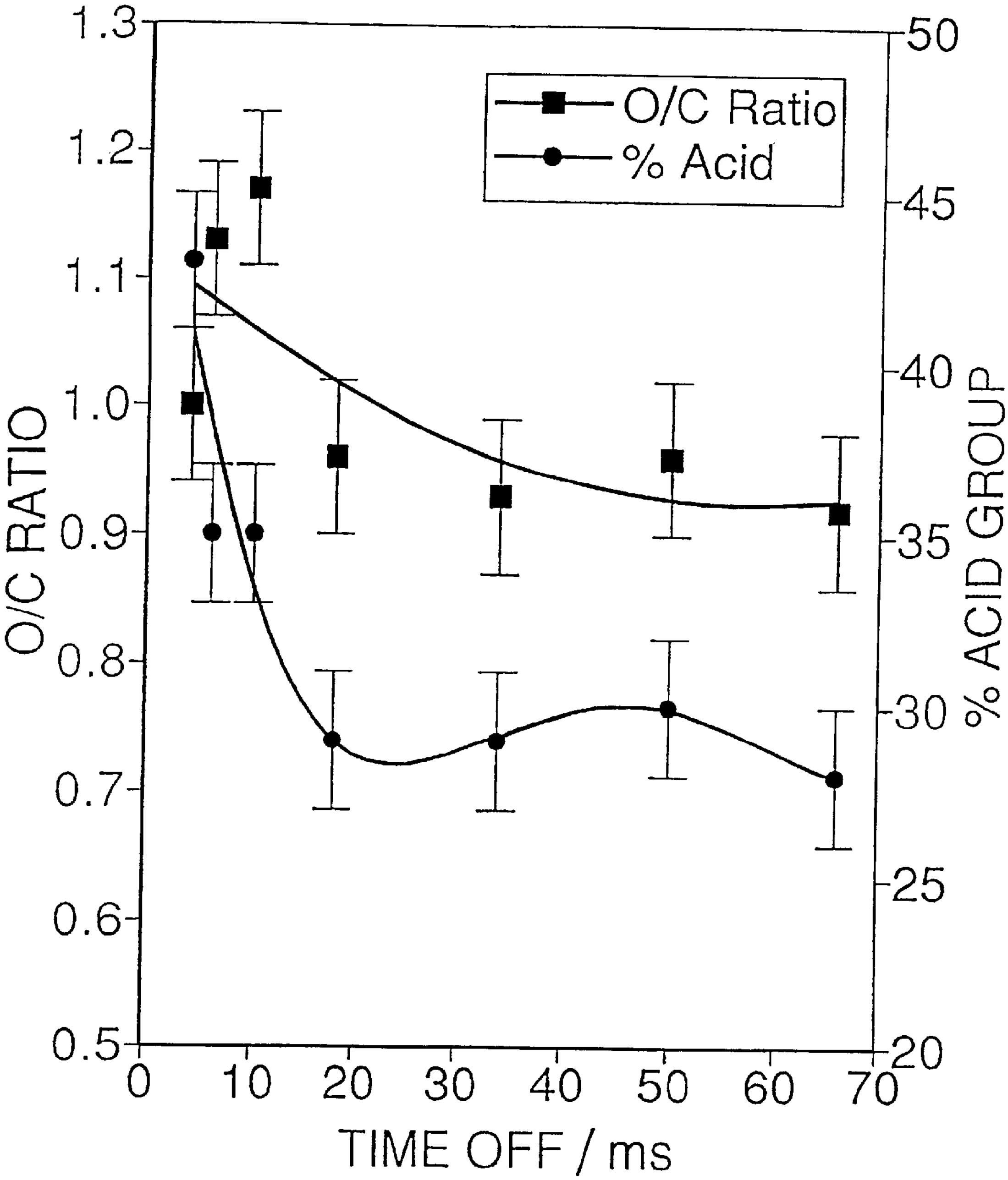

FIGS. 8*a* and 8*b* show electrical and gas pulsed plasma polymerisation of acrylic acid with oxygen as a function of $T_{off}$($T_{on}$=175 μs and $P_p$=5 W):(a) C(Is) XPS spectra; and (b) O/C ratio and percentage of acid group retention.

Figure 9A:
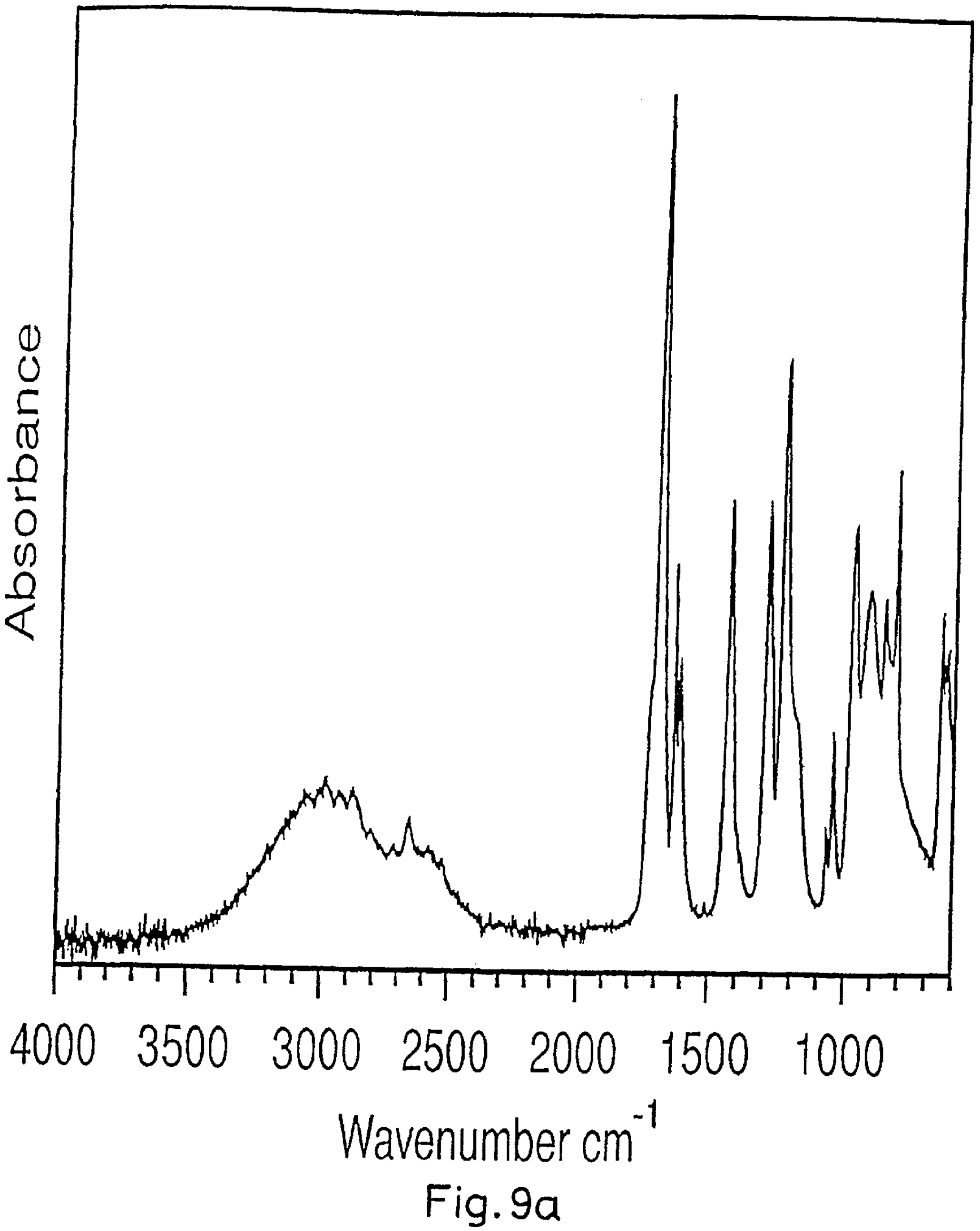
Figure 9B:
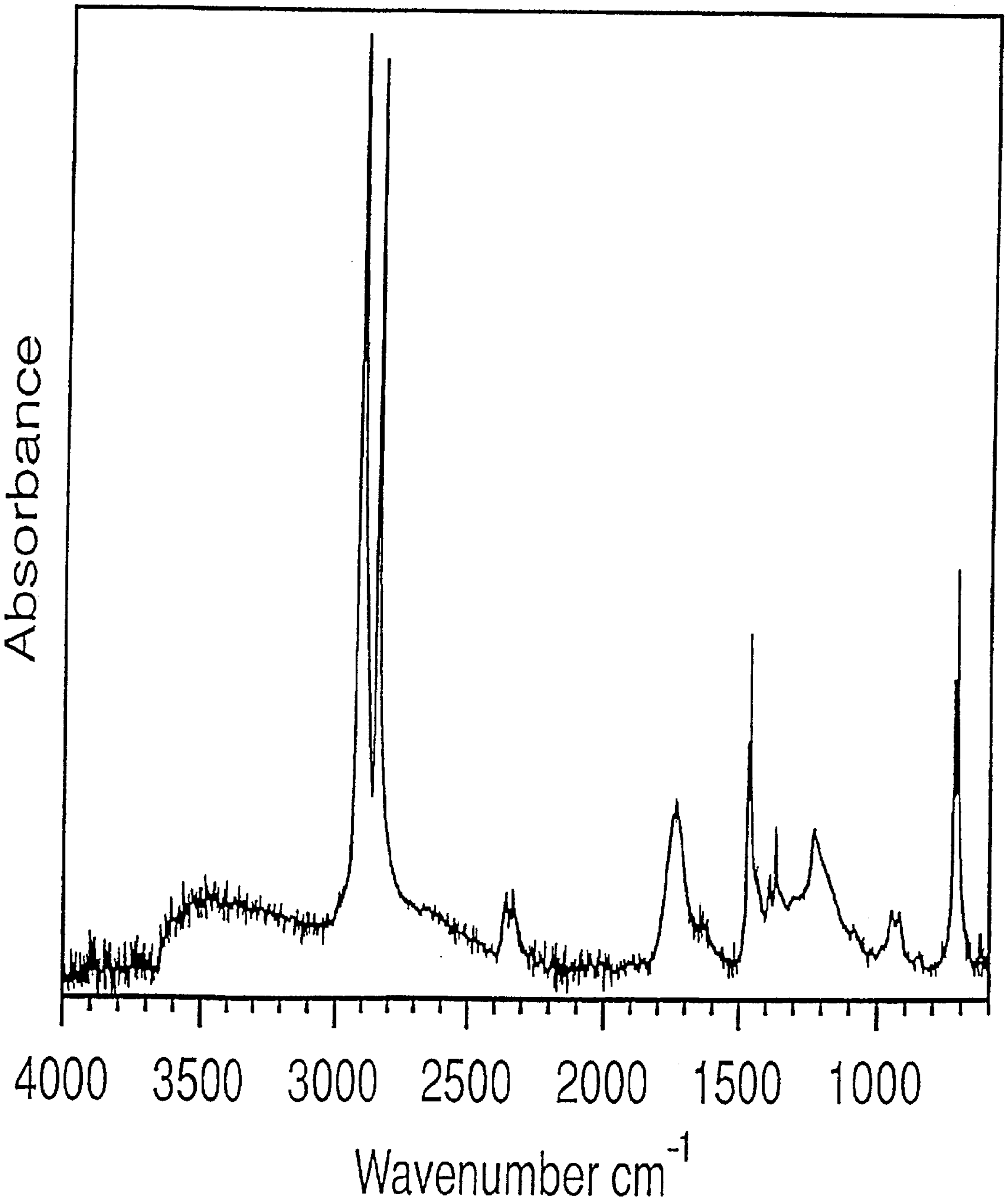
Figure 10:
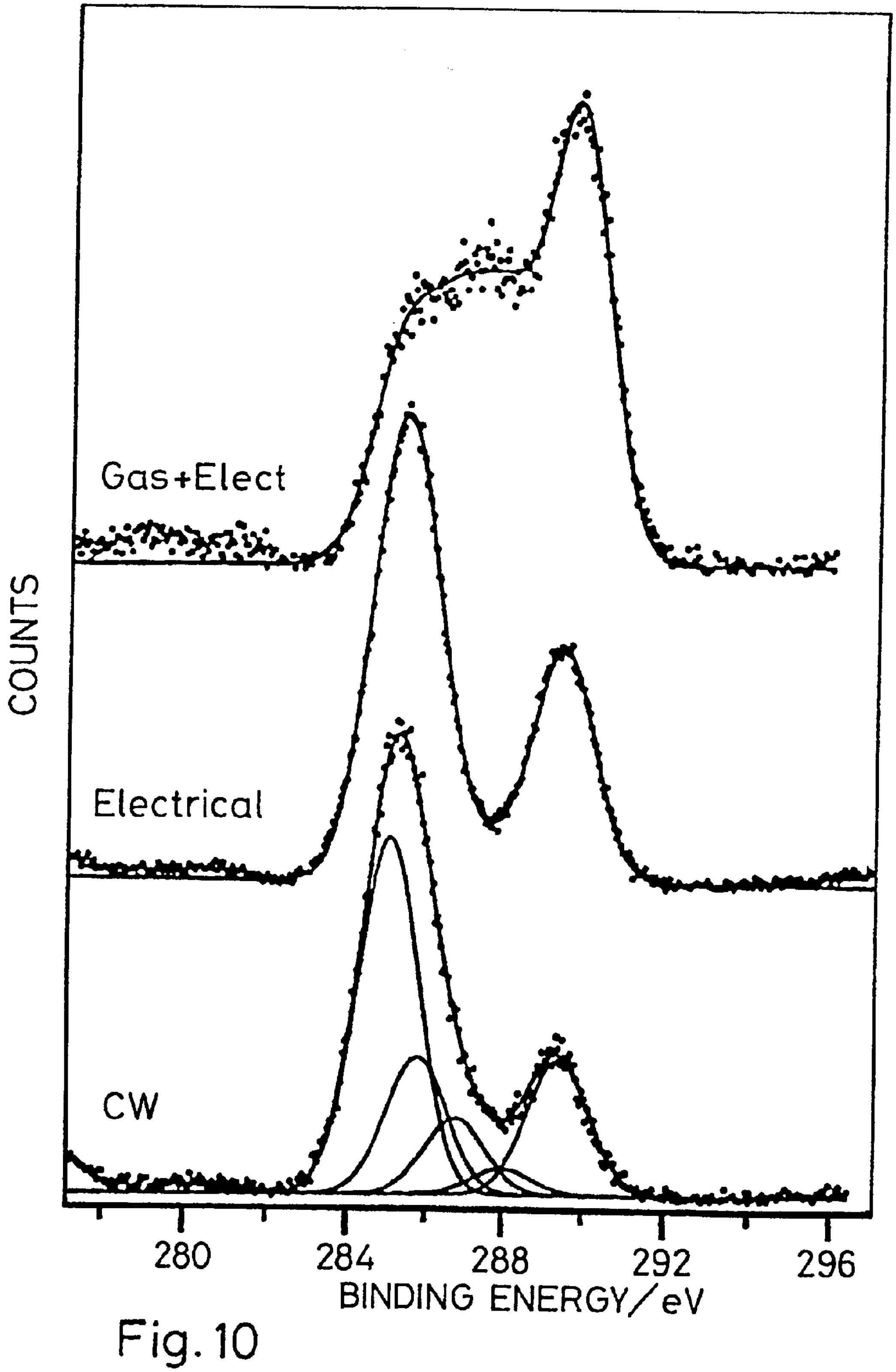

FIGS. 9*a* and 9*b* show ATR-IR spectra of: (a) acrylic acid monomer; and (b) Electrical and gas pulsed plasma polymer of acrylic acid, using oxygen, deposited on polyethylene ($T_{on}$=175 μs $_{off}$=4 ms and $P_p$=5 W), and FIG. 10 shows XPS spectra of plasma polymerisation of acrylic acid under CW, electrically pulsed and electrically-and-gas pulsed plasma conditions.

All plasma polymerisations were performed in an electrodeless cylindrical glass reactor (50 mm diameter) enclosed in a Faraday cage. The reactor was pumped by a two stage rotary pump (Edwards E2M2) via a liquid nitrogen cold trap (base pressure of $5\times10^{-3}$ mbar). Power was supplied from a 13.56 MHz source to a copper coil (10 turns) wound around the plasma chamber via an L-C matching unit and power meter.

Prior to each experiment, the reactor was scrubbed clean with detergent, rinsed with isopropyl alcohol, oven dried and further cleaned with a 50 W air plasma ignited at a pressure of 0.2 mbar for 30 minutes. A glass slide which has been washed in detergent, then ultrasonically cleaned in 1:1 cyclohexane and IPA for one hours, was positioned at the centre of the copper coils and the system pumped back down to base pressure.

Before polymerisation the acrylic acid (Aldrich 99%) was subject to several freeze thaw cycles and used without further purification. The monomer vapour was admitted via a needle valve (Edwards LV 1OK) to a pressure of 0.2 mbar for 2 minutes prior to ignition of the plasma. If gas was also to be added it was introduced via a needle valve (Edwards LV 1OK) to the required pressure. For gas pulsing experiments, gas was pulsed into the system by a gas pulsing valve (General Valve Corporation 91-110-900) driven by a pulse driver (General Valve Corporation Iota One). Both continuous wave and pulsed plasma polymerisations were performed for 10 minutes.

For pulsed plasma experiments the R.F. generator was modulated by pulses with a 5 V amplitude supplied by the pulse driver used to drive the gas pulsing valve. Pulse outputs from both the pulse generator and the R.F. generator were monitored by an oscilloscope (Hitachi V-252). For experiments involving both gas and electrical pulsing the pulse driver was used to simultaneously supply the gas pulsing valve and the R.F. generator. Thus the gas pulsing valve was open while the plasma was on.

Upon termination of the plasma, the reactor system was flushed with monomer and gas (where applicable) for a further 2 minutes, and then vented to air. Samples were then immediately removed from the reactor and affixed to the probe tips using double sided adhesive tape for analysis.

A Vacuum Generators ESCA Lab Mk 5 fitted with an unmonochromated X-ray source (Mg Kα=1253.6 eV) was used for chemical characterisation of the deposited films. Ionised core electrons were collected by a concentric hemispherical analyser (CHA) operating in a constant analyser energy mode (CAE=20 eV). Instrumentally determined sensitivity factors for unit stoichiometery were taken as C(Is) :0(Is):N0s ): Si(2P)=1.00:0.39:0.65:1.00. The absence of any Si(2p) XPS feature following plasma polymerisation was indicative of complete coverage of the glass substrate. A Marquardt minimisation computer program was used to fit peaks with a Gaussian shape and equal full width at half-maximum (FWHM).

RESULTS

Figure 1:
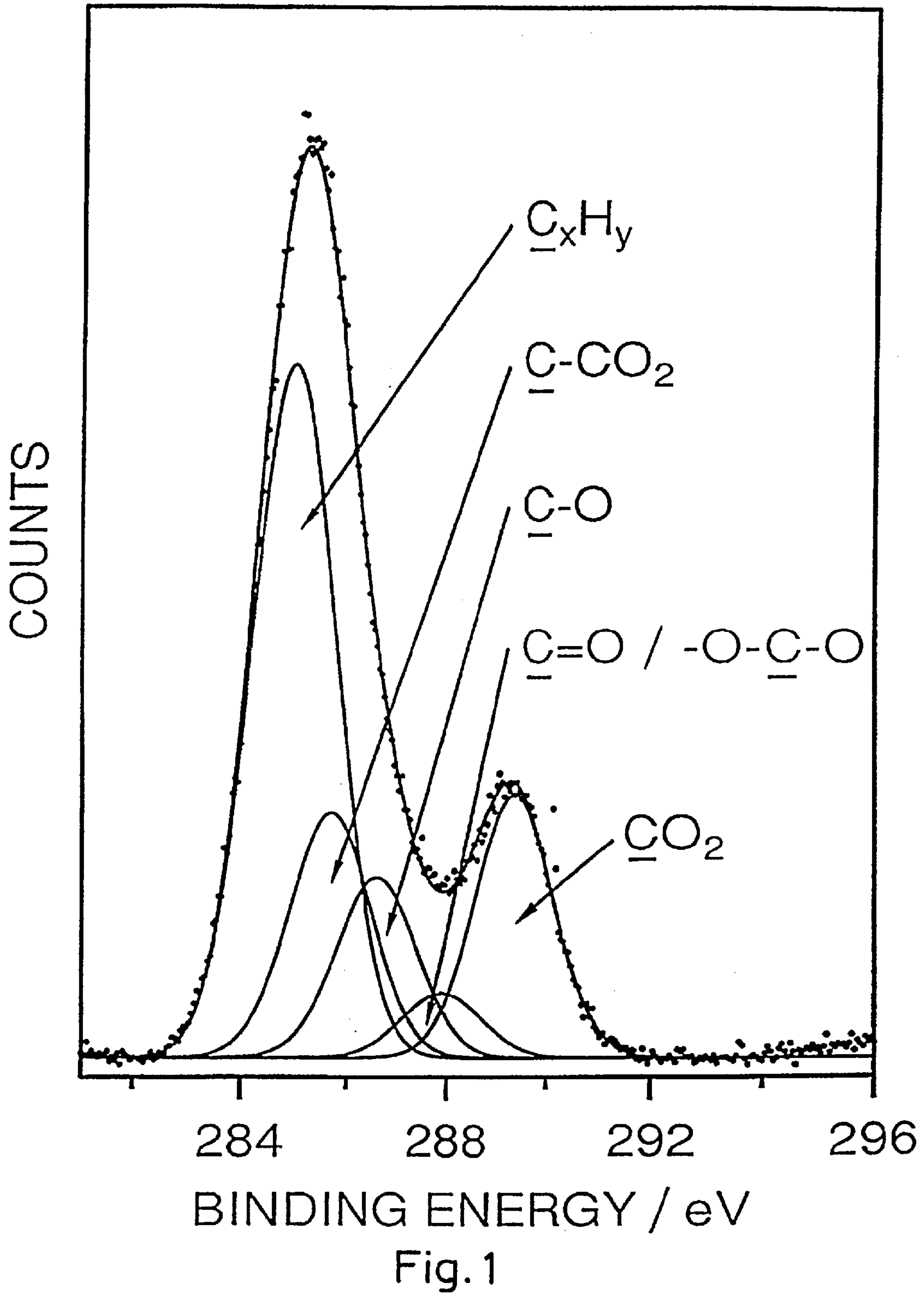
FIG. 1 shows C(Is) XPS peak fit for 2 W continuous wave plasma polymer of acrylic acid.

FIG. 1 shows the C(Is) envelope obtained by XPS analysis of acrylic acid plasma polymer. Five different carbon functionalities were fitted: $\underline{C}_x$ $H_y$ (285 eV), $\underline{C}$ $CO_2$ (285.7 eV), $\underline{C}$ O (286.6 eV), O—$\underline{C}$ O/$\underline{C}$=O (287.9 eV), and $\underline{C}O_2$ (289.0 eV). The hydrocarbon peak was used as a reference offset. The oxygen:carbon ratio was calculated by dividing the oxygen peak area (after the sensitivity factor had been taken into account) by the carbon peak area. The relative amounts of acidic carbon atom retention was compared by calculating the percentage of $\underline{C}O_2$ functionality relative to the total C(1s) area.

Figure 2A:
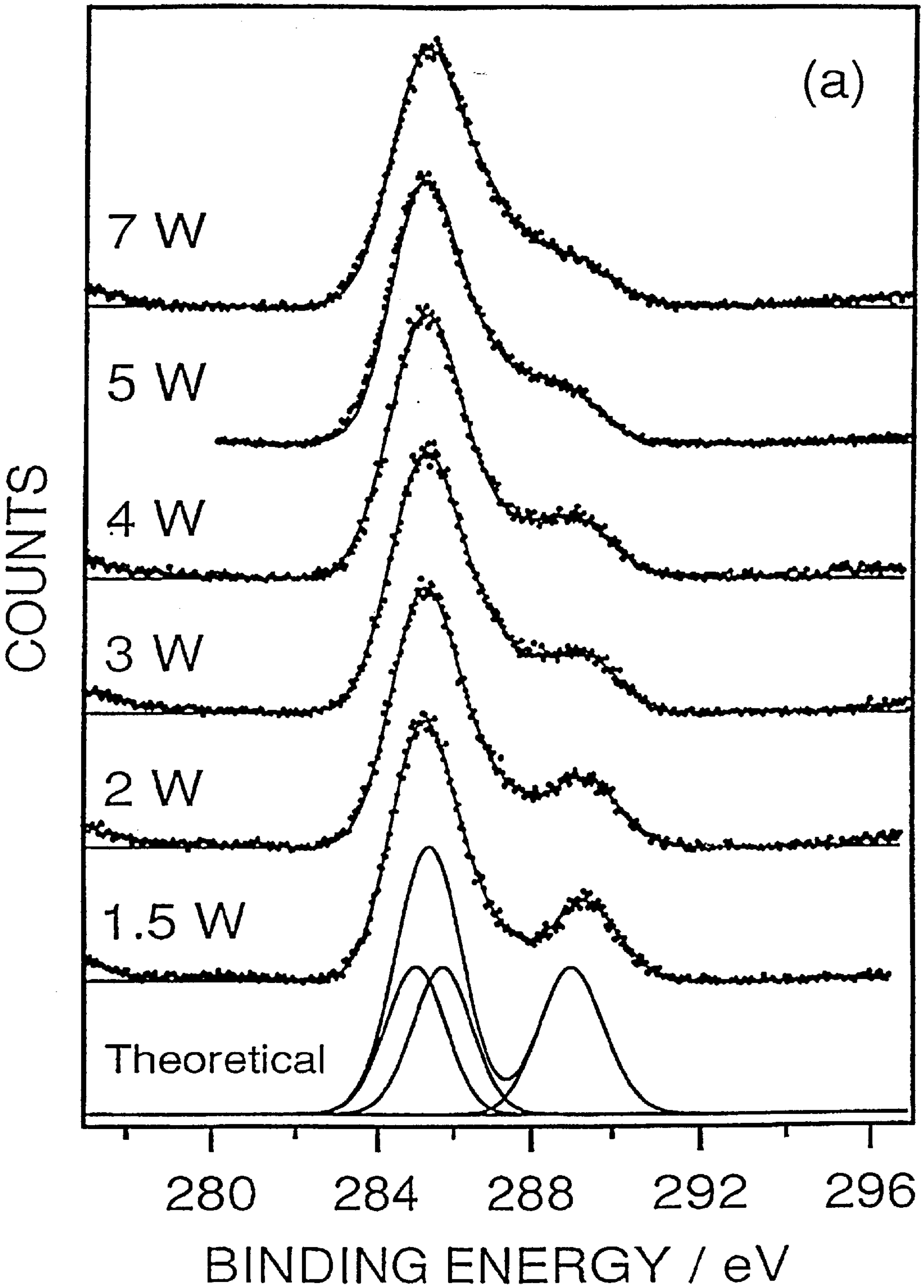
FIGS. 2*a* and 2*b* show continuous wave plasma polymerisation of acrylic acid as a function of power: (a) Q1s)
Figure 2B:
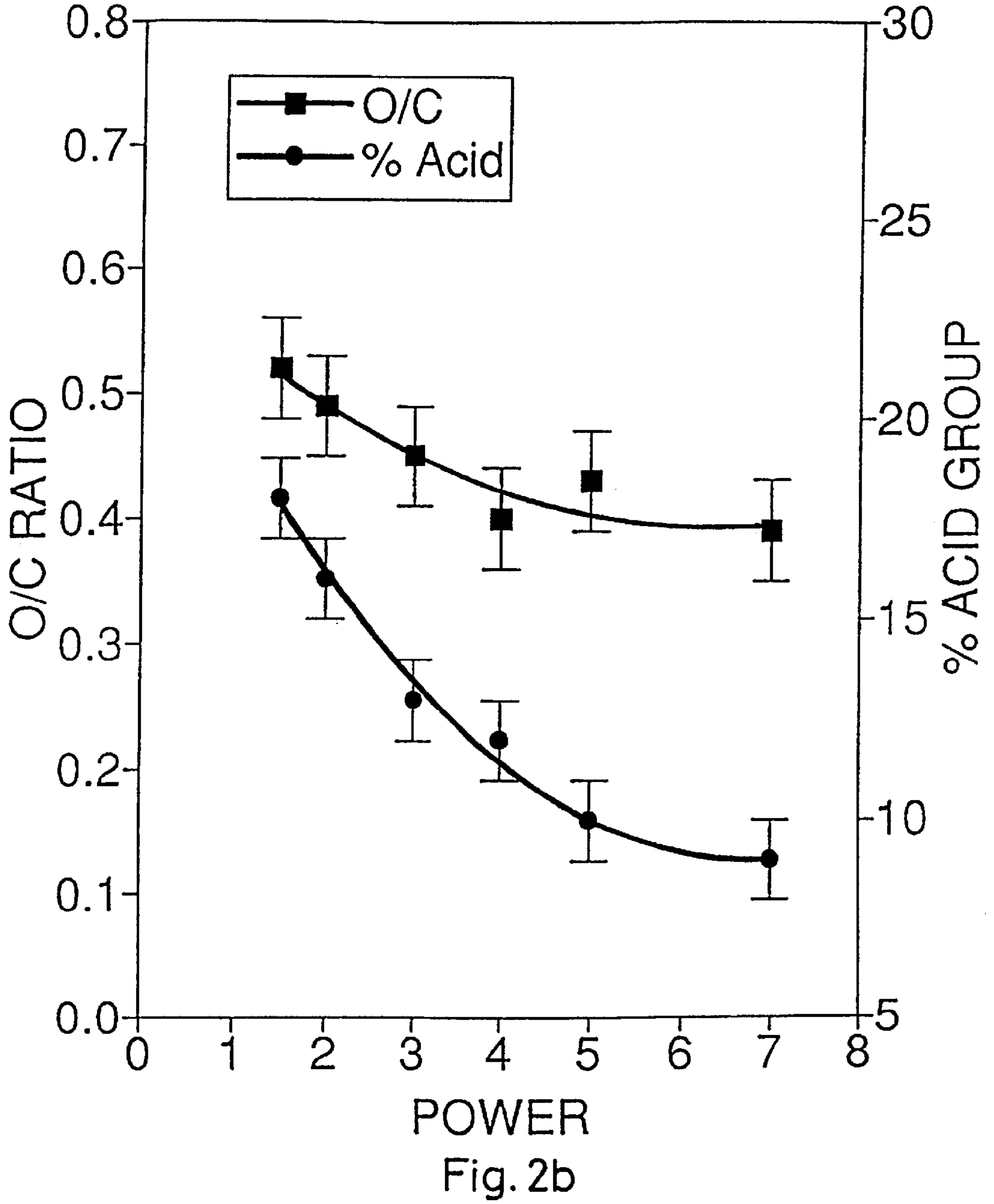

Continuous wave experiments were carried out at discharge power between 1.5 and 7 W, FIG. 2. As reported in earlier studies greater oxygen incorporation and acid group retention is achieved on decreasing the power of the discharge. The best results were found at a discharge power of 1.5 W which gave an O/C ratio of 0.52±0.02 and an acid group retention of 18%±1.

This is considerably less than the oxygen:carbon ration of 0.67 and an acid group of 33% anticipated from the monomer structure. Various electrical pulse plasma polymerisation experiments were investigated in an attempt to improve retention of the monomer structure, FIGS. 3 and 4. It was found that decreasing the average power of a pulse modulated plasma discharge, by systematically reducing the plasma ontime or increasing the time-off, enhances oxygen incorporation and acid group retention in the plasma polymer. Both the oxygen:carbon ratio and the level of acid group retention found under the lowest average power conditions are significantly greater than found for the continuous wave experiments. The O/C ratio at the lowest average power was found to be 0.72±0.03 and the acid group retention was 30%±1.

Pulsed addition of various gases was found to increase O/C ratios, FIG. 5. The percentage acid group showed less variation except when the gas used was oxygen. A large increase, well above monomer values, in both the O/C ratio and acid group retention is evident when oxygen is added to the plasma.

Gas and electric pulse time-on greatly influence the plasma polymer composition, FIG. 6; at gas and electrical pulse on times below approx. 130 $\mu$s, the electrical power of the plasma is dominant. The effect of oxygen in the system is negligible. Decreasing the time-on increases the functionality of the plasma polymer. Beyond 140 $\mu$s the oxygen partial pressure in the system becomes non trivial. The composition of the thin films produced are altered markedly by this increase in the partial pressure of oxygen reaching a maximum at approx. 175 $\mu$s. Under these conditions of the oxygen:carbon ratio was 1.00±0.04 and the percentage acid group was 43%±2.

Continuous wave polymerisation in the presence of oxygen has a direct influence on the functionalisation of films formed, FIG. 7. Increasing the oxygen content in a low power continuous wave plasma increases the O/C ratio and the percentage acid group retention. The effect is less pronounced than for pulsed modulated systems.

Increasing the plasma and gas time-off for the electrical and gas pulsed plasma polymerisation of acrylic acid using oxygen decreases the functionalisation of the films produced, FIG. 8. This is opposite to the trend reported above for the electrically pulsed polymerisation of acrylic acid alone and it may be attributed to the decrease in oxygen content of the plasma with increasing gas time-off.

The ATRAR spectrum of the acrylic acid monomer has the following peaks, FIG. 9*a*: O—H stretch (3300–2500 $cm^{-1}$), C—H stretch (2986–2881 $cm^{-1}$), C═O stretch (1694 $cm^{-1}$), C═C stretch (1634 $cm^{-1}$), O—H bend (1431 $cm^{-1}$), C-O stretch (1295–1236 $cm^{-1}$), C—H out-of-plane bend (974 $cm^{-1}$), O—H out-of-plane bend (918 $cm^{-1}$), and $=CH_2$ wagging (816 $cm^{-1}$). An ATR-IR of the plasma polymer deposited onto polyethylene, FIG. 9*b*, demonstrates a large amount of oxygen functionalisation with the O—H bend and the C=O stretches clearly evident.

To optimise the derivatisation of the poly(acrylic acid) or similar layer with fluorinated surfactant, the reaction between a carboxylic acid (or e.g. ethylene oxide or styrene oxide) and a fluorinated amine may be used. The fluorinated surfactant may be for example Dupont FSD™, a commercially available fluorinated surfactant with a terminal $CF_3$ group, the opposite end possessing a cationic head based on a substituted ammonium ion, or Hoechst AG 3658™

$F_3C—(CF_2)_n—CH_2—CH_2—N^+ (Alkyl)_3I$.

Fluoroalkyl trialkyl ammonium salt.

Formation of the sodium salt of the poly(acrylic acid) PAA is followed by reaction with a solution of the fluorinatd surfactant, the carboxylate anion and the cationic fluorosurfactant forming a salt with the fluoro-chain (terminating in a $CF_3$ group) uppermost. e.g.

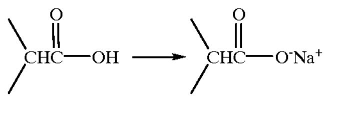

-continued

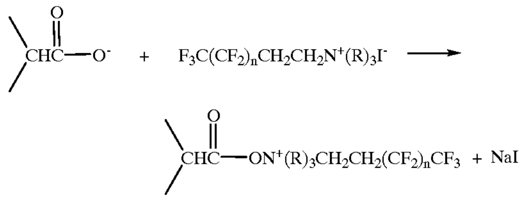

An alternative route involves a further cold plasma step using sulphur hexafluoride, $SF_6$. This reagent will yield $CF_3$ groups when reacted with carboxylic acids or with esters.

A very high degree of functional group control has been achieved by the combined pulsing techniques; see FIG. 10.

What is claimed is:

1. A method of applying a film to a body comprising exposing the body to pulsed-gas cold-plasma polymerization of an unsaturated-carboxylic acid monomer thereby forming a polymer film on a surface of the body.

2. The method of claim 1, further comprising derivitizing the polymer film with a fluoro-substituted group thereby producing a fluoro-substituted film on the surface of the body.

3. The method of claim 2, wherein the fluoro-substituted group comprises a terminal-trifluoromethyl group.

4. The method of claim 2, wherein the fluoro-substituted group is a fluorinated surfactant.

5. The method of claim 2, wherein the fluoro-substituted group is a perfluoroalkylamine.

6. The method of claim 2, wherein the fluoro-substituted group is a fluoroalkyl-trialkyl-ammonium salt.

7. The method of claim 1, wherein the body is porous or microporous.

8. The method of claim 1, wherein the unsaturated-carboxylic acid monomer is acrylic acid.

9. The method of claim 1, wherein a combination of electrical pulsing and gas pulsing is used.

10. The method of claim 1, wherein both the gas-on and gas-off times are within the range of about 0.1 microseconds to about 10 seconds.

11. The method of claim 1, wherein the pulsed gas is oxygen.

12. The method of claim 1, wherein the pulsed gas is a noble or inert gas or is hydrogen, nitrogen, or carbon dioxide.

13. The method of claim 1, wherein the unsaturated-carboxylic acid monomer is pulsed directly without a process gas.

14. The method of claim 1, wherein the plasma power applied is within the range of about 1 Watt to 100 Watts.

15. The method of claim 1, wherein the plasma power applied is 1.5 Watts to 7 Watts.

* * * * *

UNITED STATES PATENT AND TRADEMARK OFFICE

CERTIFICATE OF CORRECTION

PATENT NO. : 6,358,569 B1 Page 1 of 1
DATED : March 19, 2002
INVENTOR(S) : Jas Pal S. Badyal et al.

It is certified that error appears in the above-identified patent and that said Letters Patent is hereby corrected as shown below:

Title page,
Item [54], replace "APPLYING A FILM TO A BODY" with -- APPLYING FLUOROPOLYMER FILM TO A BODY --; and Item [73], Assignee, replace "Boss-shire" with -- Ross-Shire --.

Signed and Sealed this

First Day of October, 2002

*Attest:*

JAMES E. ROGAN

*Attesting Officer* *Director of the United States Patent and Trademark Office*